United States Patent
Nagata et al.

(10) Patent No.: US 6,852,449 B2
(45) Date of Patent: Feb. 8, 2005

(54) NEGATIVE ELECTRODE INCLUDING A CARBONACEOUS MATERIAL FOR A NONAQUEOUS BATTERY

(75) Inventors: Mikito Nagata, Valencia, CA (US); Hiroyuki Yumoto, Stevenson Ranch, CA (US); Hisashi Tsukamoto, Saugus, CA (US)

(73) Assignee: Quallion LLC, Sylmar, CA (US)

( * ) Notice: Subject to any disclaimer, the term of this patent is extended or adjusted under 35 U.S.C. 154(b) by 112 days.

(21) Appl. No.: 10/264,870

(22) Filed: Oct. 3, 2002

(65) Prior Publication Data

US 2004/0043293 A1 Mar. 4, 2004

Related U.S. Application Data

(60) Provisional application No. 60/406,846, filed on Aug. 29, 2002.

(51) Int. Cl.[7] .......................... H01M 4/36; H01M 4/04; H01M 4/58; H01M 4/60
(52) U.S. Cl. .................... 429/231.8; 429/217; 29/623.5
(58) Field of Search .......................... 429/231.8, 231.95

(56) References Cited

U.S. PATENT DOCUMENTS

| | | |
|---|---|---|
| 5,028,500 A | 7/1991 | Fong et al. |
| 5,153,082 A | 10/1992 | Ogino et al. |
| 5,244,757 A | 9/1993 | Takami et al. |
| 5,312,611 A | 5/1994 | Takami et al. |
| RE34,991 E | 7/1995 | Yoshino et al. |
| 5,612,155 A | 3/1997 | Takami et al. |

(List continued on next page.)

FOREIGN PATENT DOCUMENTS

| | | | |
|---|---|---|---|
| EP | 474183 | * 9/1991 | ............ H01M/4/58 |
| EP | 0 474 183 B1 | 12/2000 | |
| EP | 1 089 366 A1 | 4/2001 | |
| EP | 0 803 926 B1 | 12/2001 | |
| EP | 0 903 799 B1 | 3/2003 | |
| JP | 04-115457 | 4/1992 | |
| JP | 04-237971 | 8/1992 | |
| JP | 04-342966 | 11/1992 | |
| JP | 05-074462 A2 | 3/1993 | |
| JP | 05-283060 A2 | 10/1993 | |
| JP | 06-044959 A2 | 2/1994 | |
| JP | 06-111818 | 4/1994 | |
| JP | 06-163032 | 6/1994 | |
| JP | 08-031419 A2 | 2/1996 | |
| JP | 08-083608 | * 3/1996 | ............ H01M/4/02 |
| JP | 08-306390 A2 | 11/1996 | |
| JP | 2762881 B | 3/1998 | |
| JP | 10-188959 A2 | 7/1998 | |
| JP | 10-302794 A2 | 11/1998 | |
| JP | 11-054123 A2 | 2/1999 | |
| JP | 2000-228193 A2 | 8/2000 | |
| JP | 2000-251890 A2 | 9/2000 | |
| JP | 2000-260424 A2 | 9/2000 | |
| JP | 2000-294230 A2 | 10/2000 | |
| JP | 2000-323174 A2 | 11/2000 | |
| JP | 2002008655 A2 | 1/2002 | |
| WO | WO 90/13924 | 11/1990 | |
| WO | WO 98/40923 A1 | 9/1998 | |
| WO | WO 02/41417 A1 | 5/2002 | |

*Primary Examiner*—Mark Ruthkosky
(74) *Attorney, Agent, or Firm*—Cavrilovich, Dodd & LindseyLLP

(57) ABSTRACT

A negative electrode for use in secondary battery with nonaqueous electrolyte having a high voltage and energy density and a superior cycle property, characterized in that the active material comprises composite carbon materials containing hard spherical particles, carbon fibers, and graphite flakes. The hard spheres provide structure to the composite, the carbon fibers improve packing density, conductivity, and stiffness to prevent the body made thereof from swelling and decomposing, and the graphite flakes reduce friction in the mixture. An aqueous, non-fluorine-containing binder is used, along with a titanium negative substrate.

39 Claims, 4 Drawing Sheets

U.S. PATENT DOCUMENTS

| | | | |
|---|---|---|---|
| 5,631,100 | A | 5/1997 | Yoshino et al. |
| 5,744,264 | A | 4/1998 | Barker |
| 5,888,670 | A | 3/1999 | Kawakami |
| 5,900,336 | A | 5/1999 | Kabata et al. |
| 6,019,802 | A | 2/2000 | Ishizuka et al. |
| 6,022,518 | A | 2/2000 | Yamazaki et al. |
| 6,037,095 | A | 3/2000 | Miyasaka |
| 6,040,087 | A * | 3/2000 | Kawakami ............... 429/218.1 |
| 6,087,044 | A * | 7/2000 | Iwase et al. ............. 429/231.8 |
| 6,245,464 | B1 | 6/2001 | Spillman et al. |
| 6,261,722 | B1 | 7/2001 | Dasgupta et al. |
| 6,287,729 | B1 | 9/2001 | Tamaki et al. |
| 6,294,291 | B1 * | 9/2001 | Ozaki et al. ............ 429/231.4 |
| 6,300,012 | B1 | 10/2001 | Iijima et al. |
| 6,309,777 | B1 | 10/2001 | Ohta et al. |
| 6,337,156 | B1 | 1/2002 | Narang et al. |
| 6,342,319 | B1 | 1/2002 | Kuboki et al. |
| 6,350,544 | B1 | 2/2002 | Takami et al. |
| 6,350,546 | B1 | 2/2002 | Gan et al. |
| 6,355,377 | B1 | 3/2002 | Sheem et al. |
| 6,383,686 | B1 | 5/2002 | Umeno et al. |
| 6,395,427 | B1 | 5/2002 | Sheem et al. |
| 6,403,259 | B1 | 6/2002 | Kitagawa et al. |
| 6,420,070 | B1 | 7/2002 | Kasamatsu et al. |
| 6,455,199 | B1 * | 9/2002 | Kitagawa et al. ........ 429/231.8 |
| 6,479,426 | B2 | 11/2002 | Ryu et al. |
| 6,617,075 | B2 | 9/2003 | Mao et al. |
| 2002/0029464 | A1 | 3/2002 | Iijima et al. |
| 2002/0034685 | A1 | 3/2002 | Sato et al. |
| 2002/0037455 | A1 | 3/2002 | Tani et al. |
| 2002/0039684 | A1 | 4/2002 | Matsubara et al. |
| 2002/0061440 | A1 | 5/2002 | Suzuki et al. |
| 2002/0064712 | A1 | 5/2002 | Sekino et al. |
| 2003/0068555 | A1 | 4/2003 | Naruoka |
| 2003/0113632 | A1 | 6/2003 | Brown et al. |
| 2003/0152835 | A1 | 8/2003 | Desgupta et al. |

* cited by examiner

NEGATIVE ELECTRODE INCLUDING A CARBONACEOUS MATERIAL FOR A NONAQUEOUS BATTERY

REFERENCE TO PRIOR FILED APPLICATIONS

This application claims the benefit of U.S. Provisional Application No. 60/406,846 filed Aug. 29, 2002.

GOVERNMENT LICENSE RIGHTS

None

FIELD OF THE INVENTION

This invention relates to a negative electrode for a nonaqueous battery and more particularly to a negative electrode having carbonaceous active material.

BACKGROUND OF THE INVENTION

Implantable medical devices such as pacemakers, defibrillators, speech processors, left ventricular assist devices (LVAD), and neurostimulators have many stringent requirements. They must be small and lightweight for ease of implant and patient comfort. Likewise, batteries for use in the aerospace industry are required to be lightweight and have a long calendar life.

One of the problems with prior art batteries is that the calendar life is too short. This can be attributed to several mechanisms, for example, decomposition of the PVdF binder, Li deposition, and electrolyte decomposition.

SUMMARY OF THE INVENTION

Therefore, one object of the invention is to provide a negative electrode that improves the calendar life of a secondary battery having a nonaqueous electrolyte.

Another object of the present invention is to provide a secondary battery with nonaqueous electrolyte, having high voltage, and excellent cycle properties.

Another object of the invention is to provide a negative electrode substrate that minimizes capacity-reducing side reactions between the substrate and electrolyte.

Another object of the invention is to provide a negative electrode having a small surface area carbonaceous active material to reduce the amount of Li+ consumed during solid electrolyte interface (SEI) layer formation.

Another object of the invention is to provide a negative electrode having high conductivity to improve cycle life and safety.

Another object of the invention is to provide a negative electrode having a high packing density, which improves conductivity, thereby improving cycle life and safety, and increases energy density, thereby reducing battery volume and weight.

A negative electrode is therefore provided having features selected to improve the calendar life of a secondary battery having a nonaqueous electrolyte. The negative electrode of the present invention preferably comprises a coating including a carbonaceous material comprising a mixture of hard spherical particles, carbon fibers, and graphite flakes. Preferably, the hard spheres, carbon fibers, and graphite flakes have an average particle size of 10–30 $\mu$m, and occur in a ratio of approximately 70% hard spheres: 22.5% carbon fiber: 7.5% graphite flakes. These particles may be a combination of natural and artificial graphite. With this composite material, improved calendar life, as well as satisfactory high stiffness and charge and discharge conductivity of the anode can be obtained and swelling and decomposition can be prevented. This composite material also exhibits a high efficiency and has excellent stability in a battery.

When an unstable fluorine-containing binder such as PVdF is present in a negative electrode active layer, Li+ is consumed in the reaction $F^- + Li^+ \rightarrow LiF$. To avoid this, the negative electrode coating of the present invention preferably contains a binder that does not contain fluorine, and more preferably comprises carboxymethyl cellulose (CMC), which may include Na-CMC, $NH_4$-CMC, or a mixture thereof. The binder may additionally comprise styrene butadiene rubber (SBR), which imparts elasticity to the coating. The CMC preferably comprises 0–10% of the total weight of binder plus carbonaceous material, and the SBR preferably comprises 0–5% of the total weight of binder plus carbonaceous material. Alternatively, another non-fluorine-containing binder or a fluorine-containing binder that is more stable than PVdF in the battery's operating range may be used.

In one preferred embodiment of the invention, the negative electrode comprises a titanium substrate that is coated with a slurry of carbonaceous material comprising a mixture of hard spheres, carbon fibers, and graphite flakes and a non-fluorine-containing, water-based binder comprising CMC and SBR.

In a preferred method for making a negative electrode, hard spheres, carbon fibers, and graphite flakes, a binder, and water are mixed together to form a slurry. A titanium substrate is coated with the slurry; then the water is removed by evaporation. Preferably, the binder used is CMC or CMC+SBR.

DETAILED DESCRIPTION

The following text describes the preferred mode presently contemplated for carrying out the invention and is not intended to describe all possible modifications and variations consistent with the spirit and purpose of the invention. The scope of the invention should be determined with reference to the claims.

Various mechanisms may occur to affect battery calendar life and cycle life. These generally consume lithium and may occur at different potentials. Some of the possible reactions that occur at the negative electrode include SEI formation, binder reactions, lithium deposition on the substrate, and electrolyte decomposition. Various aspects of the present invention address many of these reactions.

Figure 1:
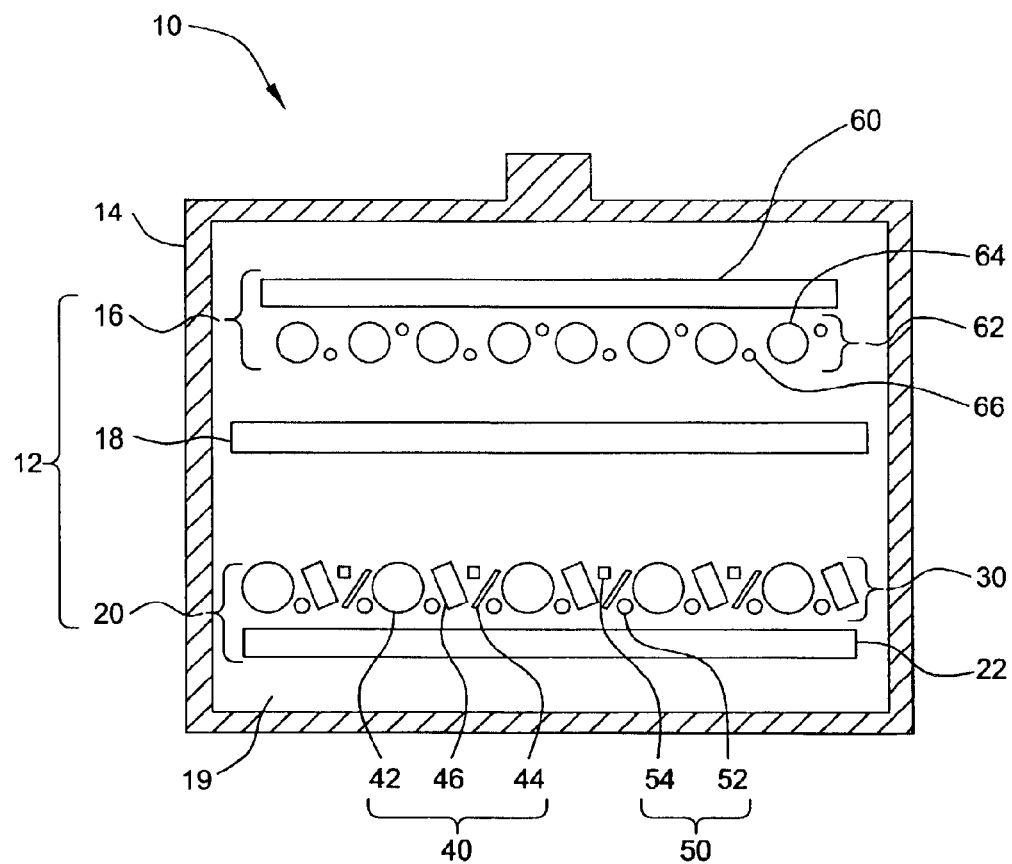
FIG. 1 is a schematic, longitudinal sectional view of a battery of the present invention.

FIG. 1 is a schematic view of a battery 10 of the present invention. An electrode assembly 12 is housed in a case 14, which is preferably hermetically sealed. Hermetic sealing is advantageous because once impurities in the battery are consumed, no more impurities can enter the inside of the battery. Thus, any lithium consumption and active material degradation reactions due to impurities are ended, whereby battery capacity is stabilized and does not degrade further due to any impurities. The electrode assembly 12 comprises positive electrode 16 and negative electrode 20, separated by a separator 18, and an electrolyte 19. Positive electrode 16 comprises a positive substrate 60 having a coating 62 made of a lithium metal oxide 64 and a binder 66. The positive substrate 60 is preferably aluminum. The lithium metal oxide is preferably a lithium transition metal oxide, and more preferably $LiCo_xNi_yM_zO_2$, where M=Mn, Al, Li, Sn, In, Ga, or Ti, and $0.15 \leq x \leq 0.5$, $0.5 \leq y \leq 0.8$, and $0 \leq z \leq 0.15$, and most preferably $LiCo_xNi_yAl_zO_2$ where $0.15 \leq x \leq 0.5$, $0.5 \leq y \leq 0.8$, and $0 \leq z \leq 0.05$, and most preferably PVdF. Coating 62 preferably also contains a material for enhancing conductivity, such as acetylene black or graphite.

The separator 18 is preferably a polyolefin, such as polyethylene.

The electrolyte 19 is not particularly limited and may be an organic liquid, polymer, or inorganic. An electrolyte is chosen that allows reversible lithium intercalation. The electrolyte is preferably a lithium salt in a cyclic and linear solvent. The electrolyte is more preferably 1-M to 1.2-M $LiPF_6$ in 25–30% ethylene carbonate (EC) and 70–75% diethyl carbonate (DEC).

The negative electrode 20 of the present invention comprises negative substrate 22 coated with a slurry 30 comprising a carbonaceous mixture 40 and a binder 50. Binder 50 preferably is flourine free and more preferably comprises CMC 52. Binder 50 may additionally contain SBR 54.

The negative electrode preferably contains active material in an amount such that its maximum * $\underline{n}$ in $C_6Li_n$ is n=0.5 to 0.8, and most preferably n=0.6. Stated another way, when the battery is fully charged (preferably, to 4.1 to 4.2 V), the lithium has intercalated at the negative electrode to form $C_6Li_{0.6}$. When * $\underline{n}$ is too high, electrolyte reduction occurs, and the interlayer spacing is increased and swelling and contraction of the material becomes more pronounced. These mechanisms tend to reduce battery calendar life. On the other hand, when maximum * $\underline{n}$ is too low, the battery voltage and capacity are low. n=0.5 to 0.8, and most preferably n=0.6 has been found to be a good compromise between calendar life and battery voltage and capacity. The positive electrode preferably forms $Li_{1-p}MO_2$, wherein M comprises one or more transition metals, and at a maximum state of charge, p=0.6 to 0.8, and most preferably p=0.7. When the battery is filly charged, the lithium has deintercalated at the positive electrode to form, most preferably, $Li_{0.3}Co_xNi_yAl_zO_2$, where $0.15 \leq x \leq 0.5$, $0.5 \leq y \leq 0.8$, and $0 \leq z \leq 0.05$. When p is too high, electrolyte oxidation occurs.

Figure 2:
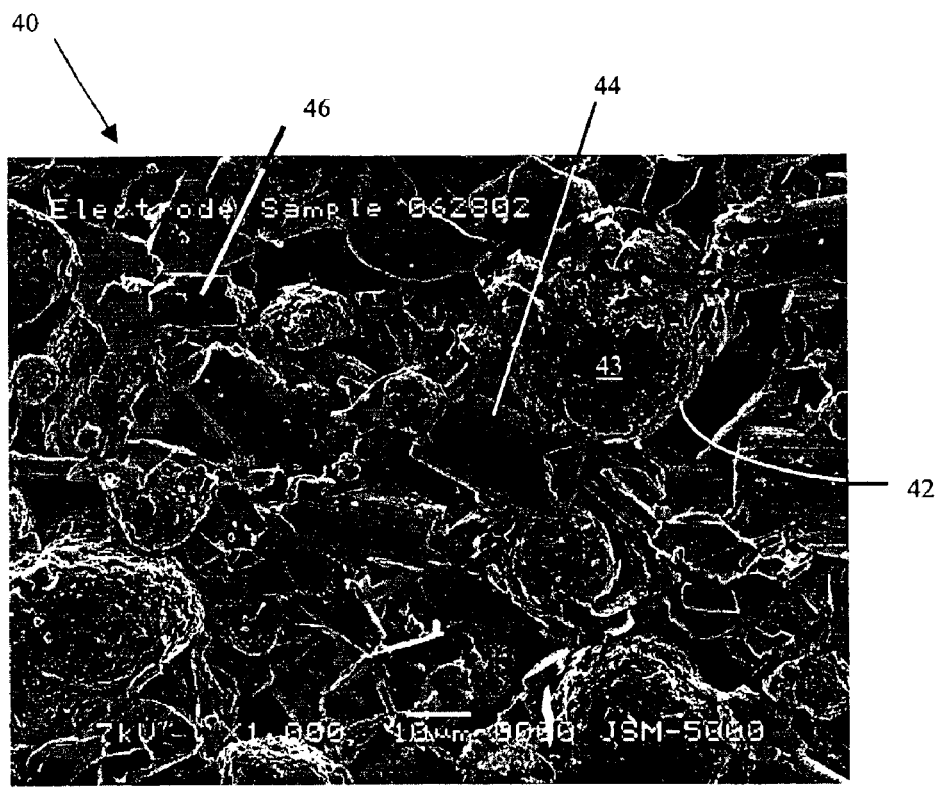
FIG. 2 is a scanning electron microscope photograph of a carbonaceous composite material of the present invention comprising spheres, fibers, and flakes.

FIG. 2 shows a scanning electron microscope photograph (×1000) of the preferred carbonaceous mixture 40 of the present invention. It preferably contains hard spheres 42, carbon fibers 44, and graphite flakes 46. Preferably, the hard spheres, carbon fibers, and graphite flakes have an average particle size of <40 µm, and occur in a ratio of approximately 70% hard spheres: 22.5% carbon fibers: 7.5% graphite flakes.

Hard spheres 42 preferably have a real density of >2.2 g/cc, a surface area of preferably <3 $m^2$/g, more preferably <2 $m^2$/g, and most preferably <1 $m^2$/g, as measured by BET, and an average particle size of preferably <40 µm and more preferably 10–35 µm. Hard spheres 42 may comprise mesocarbon microbeads (MCMB), which are available from Osaka Gas Chemicals Co., LTD. Hard spheres 42 may have a structure that is inherently rigid. Alternatively or additionally, these particles may have a rigid surface layer 43, which may comprise hard carbon, that makes them difficult to deform. Hard spheres 42 provide structural support to the preferred carbonaceous composition of the present invention. This structural support helps maintain the porosity of the mixture, which is important for allowing the electrolyte 19 to contact the surface of the carbon and to react with it. The spherical shape of the hard spheres helps to minimize the surface area of the graphite within the carbonaceous combination, limiting the amount of lithium required to form the passivation layer, or solid electrolyte interface (SEI). Side reactions such as electrolyte decomposition are also less than for other shapes of carbon materials. Artificial graphite materials used herein may be obtained by carbonization of a variety of hydrocarbon or polymeric materials. The graphite spherical particles may be mesocarbon microbeads produced by subjecting mesophase spherules, produced during the carbonization of pitch, to heat treatment for graphitization.

Carbon fibers 44 preferably have a specific surface area of <5 $m^2$/g, an average particle size of preferably <40 µm and more preferably 10–35 µm, a d002 (layer distance) of <3.36 Å, and an Lc of >100 nm. Carbon fibers that are too long may cause microshorts by penetrating the separator that separates the positive and negative electrodes. The addition of the carbon fibers to the carbonaceous composition improves packing density and conductivity. Carbon fibers also may intensify the stiffness of the anode and thus prevent the anode body from swelling and decomposing. The carbon fiber used in the invention may be a vapor grown carbon fiber. The carbon fiber may be prepared by subjecting hydrocarbons such as benzene, methane, propane, and so on to vapor phase heat-decomposition under the presence of catalyst base plate made of Fe, Ni, Co, and so on in order to make carbon fibers deposit and grow on the base plate. Other examples are pitch carbon fibers, made from petroleum or coal pitch as a raw material through a spinning and carbonating treatment, and carbon fibers made from polyacrylonitrile (PAN), which may be used in the invention.

Natural or artificial graphite flakes 46 are much softer than hard spheres 42. The addition of flakes tends to reduce friction in the mixture because the planes of carbon can slip with respect to one another, allowing the graphite flakes 46 to fit within the spaces in the mixture. We prefer an average particle size of preferably <40 µm and more preferably 10–35 µm.

In the present invention, the mixture ratio between the hard spheres, the carbon fibers, and the graphite flakes is an important factor. The hard sphere content of the composite carbon material is preferably from 0 wt. % to 80 wt. %; the carbon fiber content of the composite carbon material is preferably from 0 wt. % to 80 wt. %; and the graphite flake content of the composite carbon material is preferably from 0 wt. % to 30 wt. %. If the sphere content is above 80 wt. %, the surface contact between the particles, and thus conductivity and capacity, is too low. If the fiber content is above 80 wt. %, the packing density, and thus the capacity, is decreased. If the flake content is above 30 wt. %, the surface area is too high, and therefore the amount of lithium consumed in forming the SEI layer is too great, thereby reducing capacity. Also, a flake content above 30 wt. % may lack the structural support to keep the pores open to keep the porosity within an optimal range to allow the electrolyte to react freely with the surface of the carbonaceous material. The negative coating preferably has a porosity of 30–45%, and the positive coating preferably has a porosity of 20–40%.

The binder 50 of the negative active material coating preferably contains no fluorine, and more preferably comprises CMC. Even more preferably, styrene butadiene rubber (SBR) is added, which imparts elasticity to the mixture. In contrast, in prior art electrodes contained a PVdF binder, which was unstable and tended to break down, especially at higher temperatures, consuming Li+ in the reaction $F^-+Li^+ \rightarrow LiF$. To avoid this, the negative electrode coating of the present invention preferably uses a CMC+SBR binder containing no fluorine. Alternatively, another non-fluorine-containing binder or a fluorine-containing binder that is more stable than PVdF in the battery's operating range may be used. Another advantage of using a binder containing SBR as compared with PVdF is that SBR binds to more area of the graphite mixture than does PVdF; therefore, the exposed surface area of graphite is minimized, minimizing electrolyte decomposition at the graphite surface. A dispersion in water of the carbonaceous mixture (described above), CMC, and SBR can be made to form a slurry that can be conveniently coated onto to a metal foil substrate.

In a preferred embodiment, the substrate is about 12 µm thick and is preferably titanium or an appropriate alloy thereof, but may alternatively comprise other substrates such as stainless steel. A tape test was used to determine adhesion of a coating comprising graphite active material and SBR and CMC binders to commercially pure titanium (CP Ti) and to copper substrates. In that test, test samples were made by coating each substrate with the graphite coating, drying it, then cutting through the coating with a knife to form a grid 10 mm×10 mm grid pattern, with lines in the grid 1 mm apart. Scotch brand tape from 3M was then applied to the coating, and then peeled away. The coating was found to adhere better to the titanium substrate than to the copper.

The preferred ratios of carbon materials in the coating are:

|  | preferably | more preferably | most preferably |
| --- | --- | --- | --- |
| hard spheres | 0–80% | 10–80% | about 70% |
| carbon fibers | 0–80% | 21–80% | about 22.5% |
| graphite flakes | 0–30% | 2–30% | about 7.5% |
| total |  |  | 100% |

To this carbonaceous combination, binder materials are added in the following preferred mass per cents:

|  | preferably | more preferably | most preferably |
| --- | --- | --- | --- |
| CMC | 0 to 30% | 0 to 10% | about 1.5% |
| SBR | 0 to 30% | 0 to 5% | about 2.5% |

To make a negative electrode, a mixture of shapes of carbon particles, a binder, and water are mixed together to form a slurry, which is applied to both sides of metal foil, then dried. In a preferred method, hard spheres, carbon fibers, and graphite flakes in the amounts described above are first combined. Then the binder, preferably CMC, 2% in water, is added and mixed. Following that, SBR, 40% in water, is preferably added with additional water, then mixed to form a slurry having the mass per cents of CMC and SBR as indicated above. A 12-µm titanium foil substrate is coated with the slurry, then dried by evaporating the water off using heat, then rolled.

Figure 3:
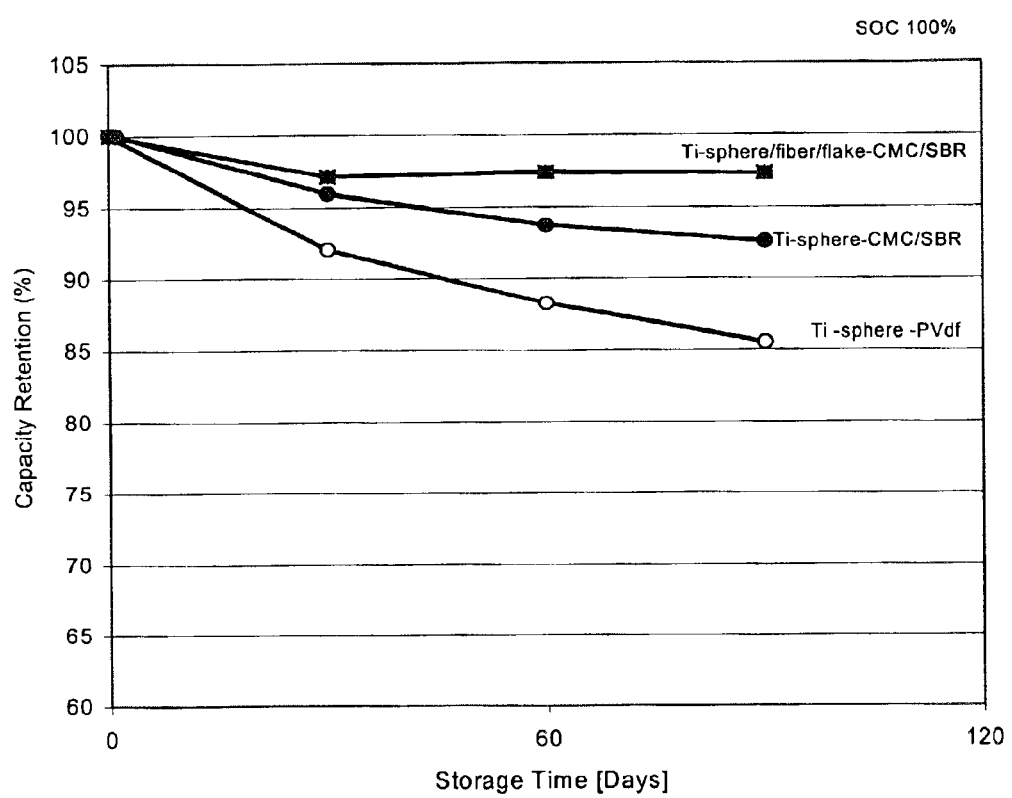
FIG. 3 is a graph showing the effect of various improvements of the present invention on calendar life.

FIG. 3 is a graph showing the effect on battery calendar life of various improvements of the present invention. The batteries were charged to a 100% state of charge (SOC) of 4.1 V, then stored at 37° C. The negative potential was approximately 0.1 V. The batteries were tested monthly for capacity retention. The electrolyte was 1.2-M LiPF6 in 25% EC/75% DEC. The CMC/SBR/carbon mass ratio was 1.5:2.5:96 for those batteries having CMC/SBR. For the battery having three types of carbon, the ratio of the three types was 70% hard spheres: 22.5% carbon fibers: 7.5% graphite flakes. As can be seen from the graph, the battery having all three types of carbon, a titanium substrate, and a CMC/SBR aqueous binder provided the best calendar life.

Figure 4:
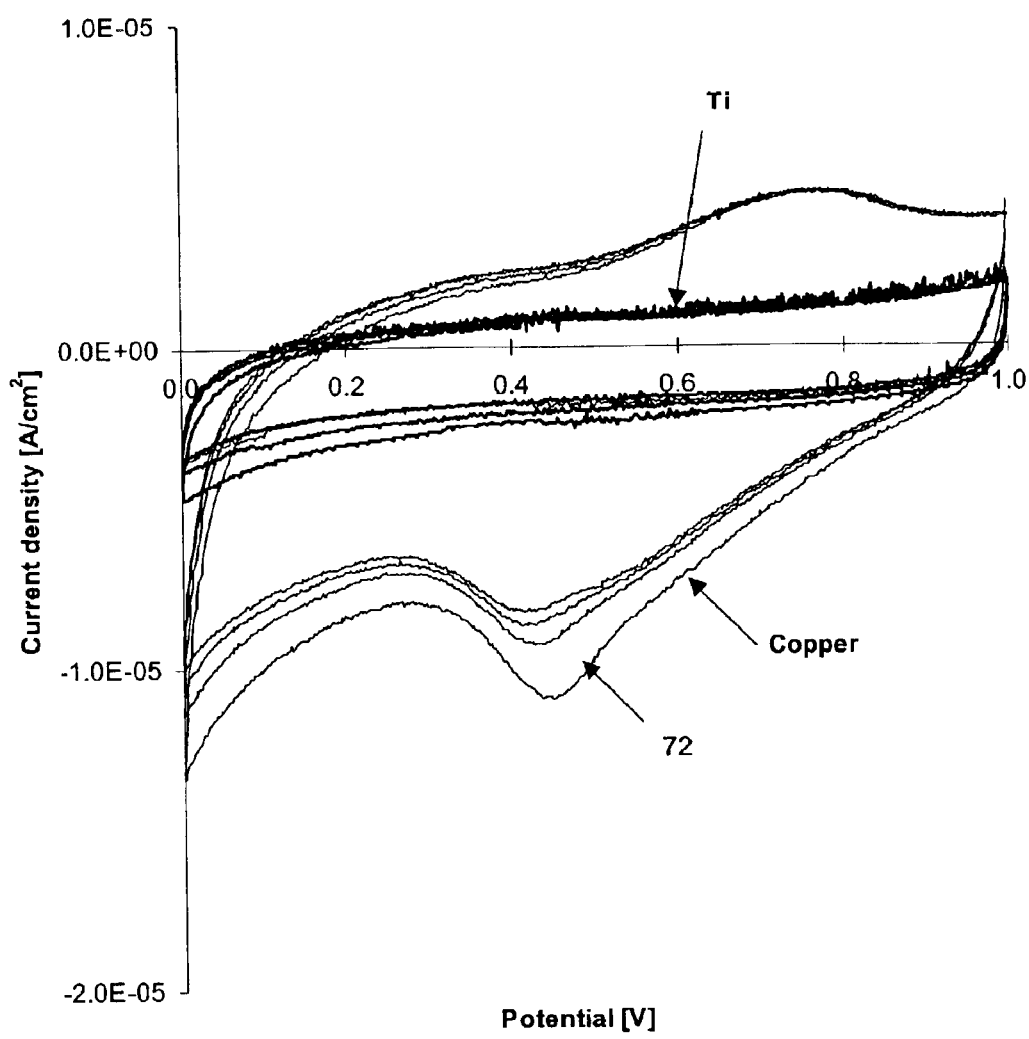
FIG. 4 is a graph showing the cyclic voltammogram of two different substrates in an electrolyte.

FIG. 4 is a graph showing the cyclic voltammogram of two different substrates in 1.2-M $LiPF_6$ in 30% EC 70% DEC electrolyte at 37° C. The potential between a polished and cleaned working electrode and a lithium metal reference electrode was swept between 5 mV and 1 V. Current flow between the working electrode and a lithium metal counterelectrode was measured, and current density at the working electrode was plotted against potential. During lithium intercalation, side reactions that degrade the electrolyte are undesirable because they reduce battery capacity and cycle life. When copper was used as the working electrode, current density showed fluctuations 72 that indicated side reactions occurring with each cycle. However, when titanium was used as the working electrode, these fluctuations were not seen. Therefore, titanium is preferred over copper as the negative electrode substrate for improving cycle life.

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

What is claimed is:

1. A negative electrode comprising:
    a substrate; and
    a coating on said substrate comprising:
        a carbonaceous material comprising a mixture of spheres, carbon fibers, and graphite flakes, wherein said carbonaceous material comprises 80 wt. % or less spheres, 80 wt. % or less carbon fiber, and 30 wt. % or less graphite flake; and a binder.

2. The negative electrode of claim 1 wherein said substrate comprises titanium.

3. The negative electrode of claim 1 wherein said carbonaceous material comprises a mixture of 10–80% spheres, 21–80% carbon fibers, and 2–30% graphite flakes by weight.

4. The negative electrode of claim 1 wherein said carbonaceous material comprises a mixture of approximately 70% spheres, 22.5% carbon fibers, and 7.5% graphite flakes by weight.

5. The negative electrode of claim 1 wherein said spheres, carbon fibers, and graphite flakes have an average particle size of 10–35 µm.

6. The negative electrode of claim 1 wherein said spheres have an average particle size of 10–35 µm.

7. The negative electrode of claim 1 wherein said binder is water-based.

8. The negative electrode of claim 7 wherein said substrate comprises titanium.

9. The negative electrode of claim 1 wherein said binder does not contain fluorine.

10. The negative electrode of claim 1 wherein said binder comprises carboxymethyl cellulose.

11. The negative electrode of claim 10 wherein said binder additionally comprises styrene butadiene rubber.

12. The negative electrode of claim 10 wherein said carboxymethyl cellulose comprises 10% or less of the total weight of binder plus carbonaceous material.

13. The negative electrode of claim 11 wherein said styrene butadiene comprises 5% or less of the total weight of binder plus carbonaceous material.

14. A battery comprising:
a case;
an electrode assembly housed in said case and comprising:
a negative electrode comprising:
a negative substrate; and
a negative coating on said negative substrate comprising:
a carbonaceous material comprising a mixture of spheres, carbon fibers, and graphite flakes, wherein said carbonaceous material comprises 80 wt. % or less spheres, 80 wt. % or less carbon fiber, and 30 wt. % or less graphite flake; and
a first binder;
a positive electrode comprising:
a positive substrate; and
a positive coating on said positive substrate comprising:
a lithium metal oxide; and
a second binder;
a separator between said negative and positive electrodes;
an electrolyte.

15. The battery of claim 14 wherein said case is hermetically sealed.

16. The battery of claim 14 wherein said negative substrate comprises titanium.

17. The battery of claim 14 wherein said carbonaceous material comprises a mixture of 10–80% spheres, 21–80% carbon fibers, and 2–30% graphite flakes by weight.

18. The battery of claim 14 wherein said carbonaceous material comprises a mixture of approximately 70% spheres, 22.5% carbon fibers, and 7.5% graphite flakes by weight.

19. The battery of claim 14 wherein slid spheres have an average particle size of 10–35 $\mu$m.

20. The battery of claim 14 wherein said first binder is water-based.

21. The battery of claim 20 said negative substrate comprises titanium.

22. The battery of claim 14 wherein said first binder contains no fluorine.

23. The battery of claim 22 wherein said first binder comprises carboxymetbyl cellulose.

24. The battery of claim 23 wherein said first binder further comprises styrene butadiene rubber.

25. The battery of claim 14 wherein said negative coating has a porosity of 30–45%.

26. The battery of claim 14 wherein said positive coating has a porosity of 20–40%.

27. The battery of claim 14 wherein said negative electrode forms $C_6Li_n$, and at a maximum state of charge, $0.5 \leq n \leq 0.8$.

28. The battery of claim 14 wherein said positive electrode forms $Li_{i-p}MO_2$, wherein M comprises one or mare 1transition metals, and at a maximum state of charge, $0.6 \leq p \leq 0.8$.

29. The battery of claim 14 wherein said electrolyte comprises a lithium salt in a cyclic and linear solvent.

30. A method for making a negative electrode comprising the steps of:
providing a substrate;
combining spheres, carbon fibers, graphite flakes, and a binder in a solvent, wherein said combining comprises combining said spheres in an amount not exceeding 80 wt. %, carbon fiber in an amount not exceeding 80 wt. %, and graphite flake in an amount not exceeding 30 wt. % of carbonaceous material;
mixing to form a slurry;
coating at least a portion of said substrate with said slurry; and
evaporating said solvent.

31. The method of claim 30 wherein said substrate comprises titanium.

32. The method of claim 30 wherein said combining comprises combining 10–80% spheres, 21–80% carbon fibers, and 2–30% graphite flakes by weight of carbonaceous material.

33. The method of claim 30 wherein said combining comprises combining approximately 70% spheres, 22.5% carbon fibers, and 7.5% graphite flakes by weight of carbonaceous material.

34. The method of claim 30 wherein said spheres have an average particle size of 10–35 $\mu$m.

35. The method of claim 30 wherein said solvent is water.

36. The method of claim 35 wherein said substrate comprises titanium.

37. The method of claim 30 wherein said binder contains no fluorine.

38. The method of claim 30 wherein said binder comprises carboxymethyl cellulose.

39. The method of claim 38 wherein said binder further comprises styrene butadiene.

* * * * *